United States Patent

Weagant

[15] 3,641,253
[45] Feb. 8, 1972

[54] CABLE SPLICE COVER
[72] Inventor: William D. Weagant, Fremont, Calif.
[73] Assignee: Sigman Industries Inc., Menlo Park, Calif.
[22] Filed: July 3, 1969
[21] Appl. No.: 838,854

[52] U.S. Cl............................................174/93, 174/138 F
[51] Int. Cl...................................................H02g 15/08
[58] Field of Search..............174/91, 93, 77, 88, 21, 138.4;
339/211, 213

[56] References Cited

UNITED STATES PATENTS

| | | | |
|---|---|---|---|
| 1,075,079 | 10/1913 | Armstrong et al. | 174/93 X |
| 2,621,228 | 12/1952 | Tompers | 174/93 |
| 2,972,004 | 2/1961 | Merrell et al. | 174/93 X |
| 3,054,847 | 9/1962 | Colbert | 174/88 |
| 2,340,868 | 3/1966 | Ets-Hokin et al. | 174/93 |

FOREIGN PATENTS OR APPLICATIONS 940,338  1/1959  Great Britain...........................174/91

Primary Examiner—Darrell L. Clay
Attorney—Limbach, Limbach & Sutton

[57] ABSTRACT

An in-line reenterable cable splice box with two end plates that can be sealed to the cable and a hollow cylinder that can be rigidly and removably supported and sealed between end plates by end caps. To hold the end plates apart a plurality of rigid members extend between the end plates or the cylinder can have radially inwardly directed spaced-apart lugs to cooperate with radially outwardly directed, spaced-apart lugs on the end plates.

7 Claims, 6 Drawing Figures

3,641,253

INVENTOR.
WILLIAM D. WEAGANT
BY
Limbach and Limbach
ATTORNEYS

INVENTOR.
WILLIAM D. WEAGANT

CABLE SPLICE COVER

SUMMARY OF INVENTION

It is often desirable to cover a splice or terminal in an electrical cable or the like with a splicing sleeve or shield to prevent moisture from gaining access to the splice or terminal and such shields have been utilized in the past. When such a prior art device is sealed over the splice, it is removably only by breaking open the cover, by melting solder joints, by cutting away plastic adhesives, or by otherwise destroying the seal.

The present invention provides a shield structure which can be assembled over the splice and tightly sealed to the cable so as to be moistureproof. When it is found desirable to inspect or otherwise have access to the splice, the shield structure can be opened and thereafter reclosed and resealed without destruction of the seals. This is accomplished by the provision of a pair of end plates that can be sealed to the cable and a hollow cylinder that is slidable over at least one end plate and can be rigidly and removably supported and sealed between end plates.

In accordance with one aspect of the present invention the hollow cylindrical main body has a plurality of lugs directed radially inward at the ends of the body. The end plates are provided with openings through which cables can extend and with a plurality of lugs extending radially outward alignable with and abutting the lugs on the cylindrical body. The diameter of the end plate including the length of the lugs is smaller than the internal diameter of the cylindrical body so that the cylinder can slide thereover. End caps then secure the end plates to the main body with O-rings or mastic-type sealant providing a seal between the body and the caps and also between the caps and the end plates. The cables that form a splice can be permanently sealed to the end plates where they extend through the end plates. To gain access to the splice, the end caps are backed off from the main body, the main body is rotated slightly so that the lugs thereon become out of alignment with the lugs on one of the end plates, and the body is slipped over the end plate and away from the splice. The shield is reassembled over the splice by reversing these steps.

In accordance with another aspect of the present invention the end plates are held apart by rigid members which extend therebetween inside the cylinder and which can be removed after the cylinder is opened to operate on the splice.

The present invention provides a cable splice shield that can be easily assembled and located on a splice and longitudinally positioned over the splice and sealed to the cable after the splice is complete. Furthermore, the splice cover can be reentered to operate on the splice without destroying the seal created with the cable.

The features and advantages of this novel shield will become more apparent from a perusal of the following specification taken in connection with the accompanying drawings wherein.

Figure 1:
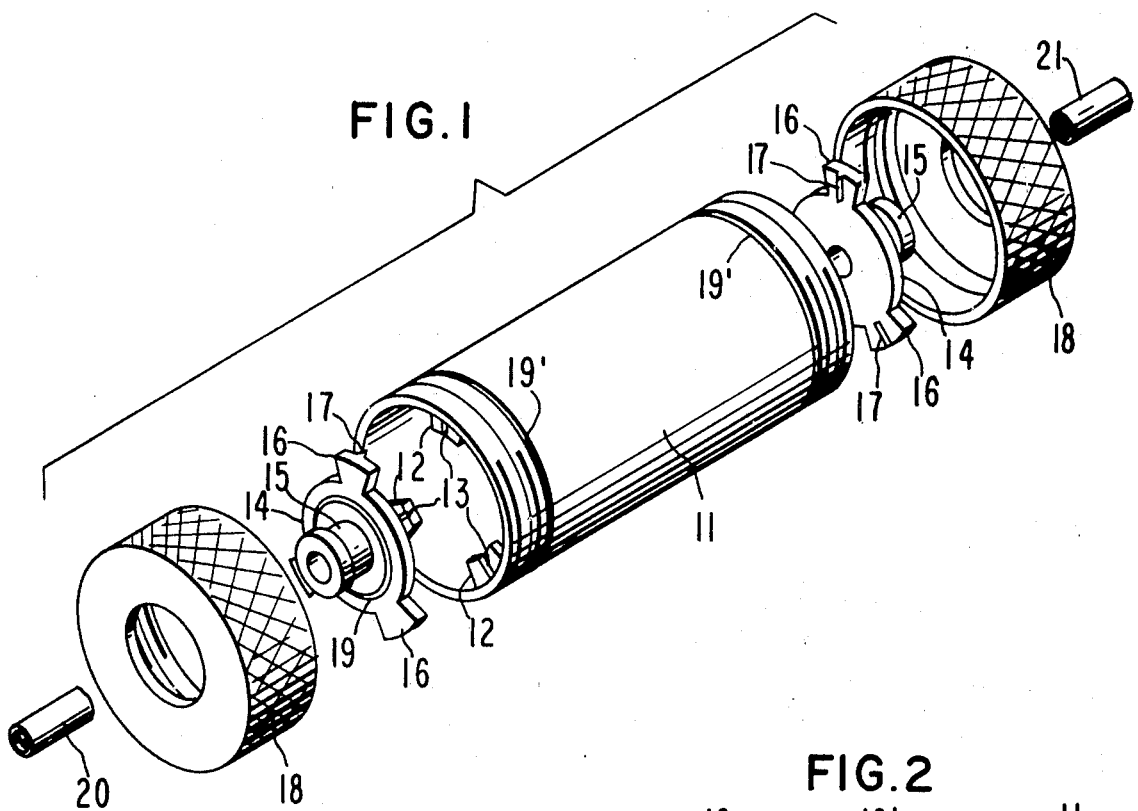
FIG. 1 is an exploded perspective view of a novel shield made in accordance with the present invention and positioned over the cable before splicing.
Figure 2:
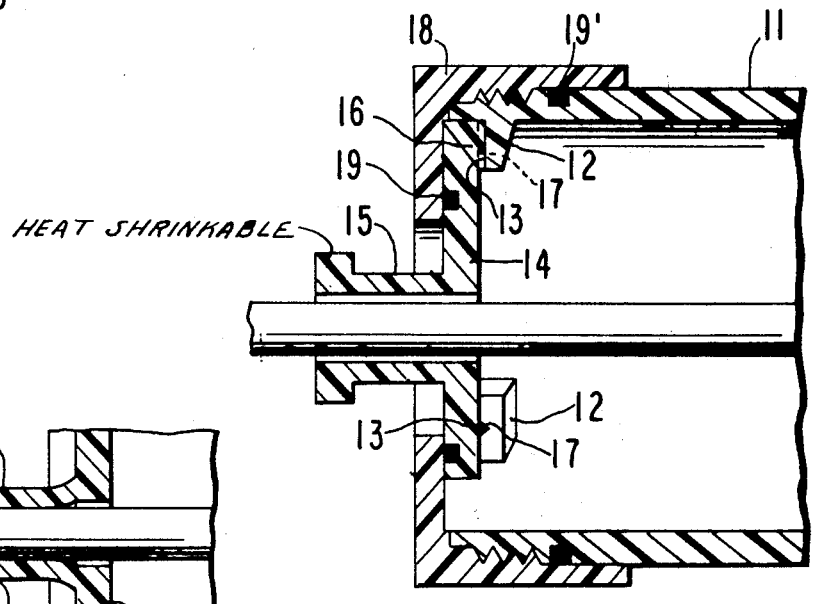
FIG. 2 is a longitudinal cross section view showing one end of the shield assembled on the spliced cable and before being sealed to the cable.
Figure 3:
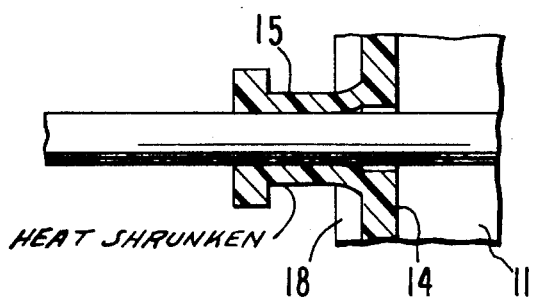
FIG. 3 is a longitudinal sectional view showing one method of sealing the shield to the cable.

Referring now to FIGS. 1, 2, 3 and 5 of the drawings, the splice cover utilized to illustrate the present invention comprises a main body or cylinder 11 having threaded ends and three spaced apart, internally directed lugs 12 at each end. Each lug has a small recess 13 formed therein facing axially outward. A pair of end plates 14 are provided, each having a hollow central neck portion 15 and three radially projecting lugs 16 each having a slight ridge 17. A pair of annular, internally threaded end caps 18 and four rubber O-rings 19 and 19' complete the components of the cover assembly.

In use, at the time a splice is to be made between two cable ends 20 and 21, one cap 18, one end plate 14 and associated O-ring 19 and the main cylinder with its two O-rings 19' are slipped over one of the cable ends. The second cap 18, end plate 14 and associated O-ring 19 are slipped over the other cable end. These parts are moved out of the way while the two cable ends are spliced together in any suitable manner. After splicing, the splice cover is assembled by first bringing one end plate 14 up to one end of the body 11 until the lugs 16 on the end plate contact the internally directed lugs 12 in the body. The end plate 14 is aligned so that the ridges 17 on the lugs 16 nestle in the recesses 13 in the lugs 12. The O-ring 19 is placed against the face of the plate 14 and the end cap 18 screwed over the end of the cylinder 11, forming a seal with the cylinder via O-ring 19' and a seal with the end plate via O-ring 19. The other end plate 14 and end cap are assembled on the opposite end of the cylinder in the same manner. The assembled splice cover can then be moved longitudinally of the cable for positioning at the precise location desired and ready for sealing on the cable.

The cover parts are made of a strong durable material with high-impact resistance and high-softening point such as thermosetting resins such as a phenolic or polyester or polycarbonate, polysulfone or preferably nylon, while the neck portions 15 of the end plate are preferably made of a heat shrinkable material. Heat shrinkable material has the property of plastic or elastic memory imparted thereto and, during manufacture, the cylindrical neck portions 15 are expanded under heat and pressure to a diameter greater than normal and cooled while kept under pressure. Examples of such a material are found in Weagant U.S. Pat. No. 3,423,518. Polymeric materials which have been cross-linked by chemical means or by irradiation with high energy electrons or nuclear radiation or noncrystalline polymeric materials with plastic or elastic memory, such as polyvinylchloride, polyvinyl acetate, etc., may be employed.

When both end plates 14 and end caps 18 have been assembled on the cylinder 11 and the assembly properly positioned, the cylinder is centered over the splice and heat is applied to the neck portions 15 to heat them above the heat recovery temperature (e.g., 250° F.) of the material. The material, in relaxing to its normal diameter size, closes about the insulation on the cable 20, 21 and forms a sturdy seal between the splice cover assembly and the spliced cables. Preferably, the inner surfaces of the neck portions 14 may be coated with sealant adhesive such as a semithermo plastic sealant before heating so that, on contraction, the sealant is caused to flow and form a watertight seal between the necks and cables.

Figure 5:
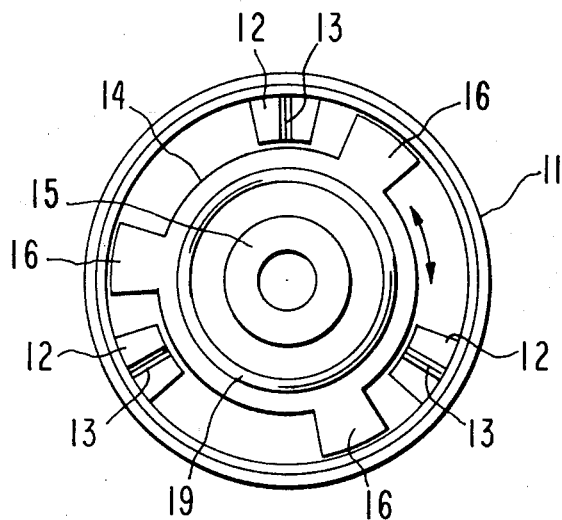
FIG. 5 is a plan view of the end of the main body and one of the end plates shown rotated to the removal position where their lugs are out of alignment.

This splice cover may be easily opened to obtain access to the splice by loosening both end caps 18 and backing them away from the end plates 14. The cylindrical body 11 is then rotated slightly so that the lugs 12 in the cylinder 11 are no longer in alignment with the lugs 16 on the end plates 14. This positioning is shown in FIG. 5. There is enough give or flex to the end plates 14 in the axial direction to permit the ridges 17 to move out of the recesses 13 when the cylinder is rotated. The cylinder may then be slid over one or the other of the end plates 14, the lugs 12, 16 moving past each other, until the cylinder clears the end plate completely.

To reassemble the cover over the splice, the cylinder 11 is moved axially back over the end plate, centered between the two end plates, and rotated until the ridges 17 in the lugs 16 are again nestled in the recesses 13 in the lugs 12. The two end caps 18 are then screwed onto the cylinder ends so that the cover assembly is securely reclosed and resealed.

Figure 4:
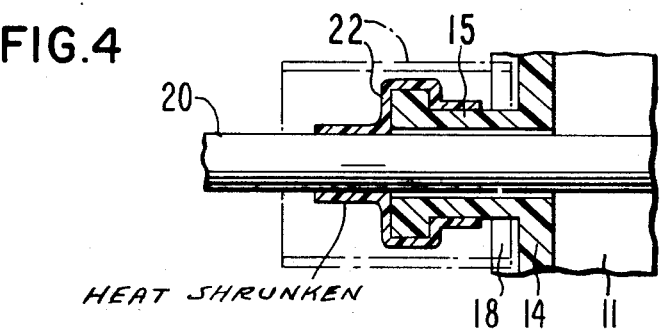
FIG. 4 is a longitudinal sectional view showing another method of sealing the shield to the cable.

There is shown in FIG. 4 another method for sealing the neck portion 15 of the end plate 14 to the cable 20. In this embodiment, the neck portion 15 is made of the same rigid material, e.g., nylon, as the plate 14. A sleeve 22 is provided made of the heat shrinkable material described above. When this sleeve is slipped over the free end of the cable 20 at the same time the end plate 14 is positioned, it is in its expanded form as shown by the dash lines in FIG. 4, i.e., a hollow cylinder of larger diameter than the neck 15. After the cover has been fully assembled, the sleeve is slipped over the neck 15 and heat applied thereto to cause it to shrink tightly upon the cable 20 and neck 15 to form a seal. Sealant is preferably employed on the inner surface of the sleeve 22.

Figure 6:
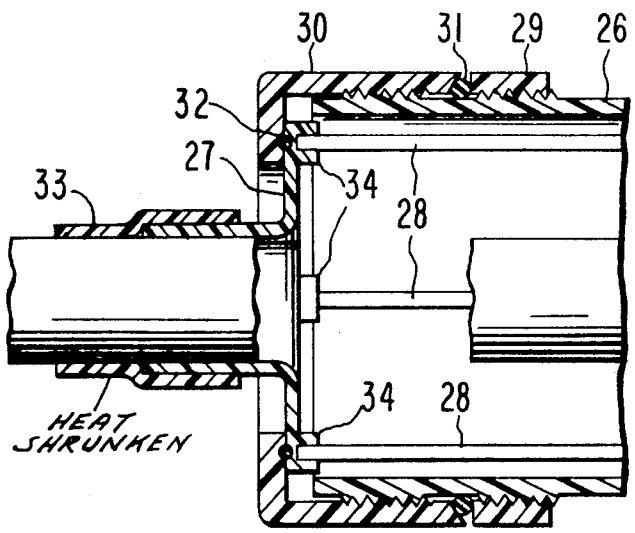
FIG. 6 is a longitudinal cross-sectional view showing another embodiment of the invention.

Another embodiment of the splice cover is shown in FIG. 6 comprising a main cylinder 26, and end plate 27, spacing bars 28, stop ring 29, end cap 30, O-rings 31 and 32, and sealing sleeve 33. Only one end of the splice cover is shown in FIG. 6 but it should be understood that the other end is a duplicate of that shown. The operation of this embodiment is similar to that described above except that the function of the lugs 12 and 16 is now performed by the bars 28 which nestle into seats 34 in the end plate 27. The spacing bars 28 hold the end plates in axial spaced apart relationship while the end caps 30 are threaded onto the main cylinder and against the end plates 27, the O-rings forming seals between the main cylinder 26, end plates 27 and end caps 30. The adjustable threaded ring 29 serves as a stop for the caps 30 and a seal bearing. After assembly, the end plates 27 are sealed to the cable by means of the heat shrinkable sleeve 33. By backing off the end caps 30, the cylinder 26 is freed to slip over the end plate 27, to expose the bars 28 and give access to the spliced cable. Should a more complete access be necessary, the bars 28 may be rotated out of the nests 34 and removed. The cover may be reassembled by reversing the order of the above steps.

The rods can take the form of a split cylinder, and it will be appreciated in the several embodiments described that only one end plate need be dimensioned to permit the cylinder to slide thereover.

Additionally, the rods can be threaded with oppositely directed threads at their opposite ends so that the rods could be simultaneously screwed into the end plates and serve as both tension as well as compression members.

The specific embodiments disclosed herein are illustrative of the invention and it should be realized that other forms of apparatus may be made without departing from the scope of this invention.

We claim:

1. An article of manufacture in the form of a reopenable cover assembly for enclosing a cable splice between two cables passing thereinto comprising a unitary hollow elongated main body, a pair of end plates removably covering at least a portion of the open ends of the body, the outer dimensions of at least one end plate being slightly smaller than the inner dimensions of the body the entire length thereof in at least one azimuthal position of the plate with respect to said body such that the entire body can slip over the end plate, each end plate having an opening therein for passing a cable member therethrough, means for sealing each of said end plates to a cable member, mounting and sealing means applying axial pressure against said end plates mounting and sealing the end plates on the ends of the body, and a plurality of spacing members positioned within said body and abutting said end plates, said spacing members of a length maintaining the end plates in axially spaced apart relationship at the ends of said body.

2. The article of manufacture in accordance with claim 1 wherein said means for sealing each end plate to a cable member includes a neck portion surrounding the opening in said at least one of said end plates, said neck portion being made of a heat shrinkable material which, when heated, closes upon a cable member passing therethrough.

3. The article in accordance with claim 1 wherein said end plates have a neck portion surrounding the opening therein and said means for sealing each end plate to a cable member includes a sleeve slipped over said neck portion, said sleeve being made of a heat shrinkable material which, when heated, closes upon the neck portion and a cable member passing therethrough.

4. An article of manufacture in the form of a reopenable cover assembly for enclosing a cable splice between two cables passing thereinto comprising a unitary hollow elongated main body having a plurality of radially inwardly projecting, spaced apart lugs adjacent at least one end thereof, a pair of end plates removably covering at least a portion of the open ends of said body, at least one of said end plates having a plurality of radially outwardly projecting spaced apart lugs, the lugs on said one end plate spaced apart and aligned with and abutting the lugs on said body in one azimuthal position of said one end plate and said body and to be out of alignment and abutment in another azimuthal position of said one end plate and said body, the outer dimensions of said one end plate being slightly smaller than the inner dimensions of said body the entire length thereof in at least said other azimuthal position of said one end plate with respect to said body such that the entire body can slip over said one end plate, each end plate having an opening therein for passing a cable member therethrough, means for sealing each of said end plates to a cable member, and mounting and sealing means removably mounting said end plates on the ends of said body and sealing said end plates to said body.

5. The article as claimed in claim 4 wherein said means for sealing each end plate to a cable member includes a neck portion surrounding the opening therein, said neck portion being made of a heat shrinkable material which, when heated, closes upon a cable member passing therethrough.

6. The article as claimed in claim 4 wherein said end plates have a neck portion surrounding the opening therein and said means for sealing each end plate to a cable member includes a sleeve slipped over said neck portion, said sleeve being made of a heat shrinkable material which, when heated, closes upon the neck portion and a cable member passing therethrough.

7. The article of claim 4 where the abutting lugs have mating ridges and recesses.

* * * * *